US012771731B2

(12) United States Patent
Dauneria et al.

(10) Patent No.: US 12,771,731 B2
(45) Date of Patent: Oct. 20, 2026

(54) SIMULTANEOUS CALLING IN 5G

(71) Applicant: Telefonaktiebolaget LM Ericsson (publ), Stockholm (SE)

(72) Inventors: Ankur Dauneria, New Delhi (IN); George Foti, Dollard des Ormeaux (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 415 days.

(21) Appl. No.: 18/271,568

(22) PCT Filed: Jan. 7, 2022

(86) PCT No.: PCT/IB2022/050121
§ 371 (c)(1),
(2) Date: Jul. 10, 2023

(87) PCT Pub. No.: WO2022/153154
PCT Pub. Date: Jul. 21, 2022

(65) Prior Publication Data

US 2024/0073254 A1 Feb. 29, 2024

Related U.S. Application Data

(60) Provisional application No. 63/138,111, filed on Jan. 15, 2021.

(51) Int. Cl.
*H04L 65/1016* (2022.01)
*H04L 65/1059* (2022.01)
*H04L 65/1093* (2022.01)

(52) U.S. Cl.
CPC ...... *H04L 65/1016* (2013.01); *H04L 65/1059* (2013.01); *H04L 65/1093* (2013.01)

(58) Field of Classification Search
CPC ............. H04L 65/1016; H04L 65/1059; H04L 65/1093; H04L 65/1096
See application file for complete search history.

(56) References Cited

U.S. PATENT DOCUMENTS 11,171,996 B2 * 11/2021 Kalapatapu ......... H04L 65/1016
2011/0289203 A1 * 11/2011 Braudes ................ H04L 67/535
709/227

(Continued)

FOREIGN PATENT DOCUMENTS

WO 2020180222 A1 9/2020

OTHER PUBLICATIONS

Author Unknown, "Technical Specification Group Services and System Aspects; IP Multimedia Subsystem (IMS); Stage 2 (Release 16), " Technical Specification 23.228, Version 16.6.0, Dec. 2020, 3GPP Organizational Partners, 349 pages.

(Continued)

*Primary Examiner* — Abdullahi E Salad
(74) *Attorney, Agent, or Firm* — Sonoda & Kobayashi Intellectual Property Law; Sarvajit S. Patil

(57) ABSTRACT

Systems and methods for simultaneous calling in a cellular communications system are disclosed. In one embodiment, a method performed by a first wireless communication device for simultaneous Internet Protocol (IP) Multimedia Subsystem (IMS) sessions between the first wireless communication device and two or more other wireless communication devices comprises establishing a first IMS session with a second wireless communication device and, while the first IMS session is ongoing and without placing the first IMS session on hold, establishing a second IMS session with a third wireless communication device. In this manner, (Continued)

simultaneous calling is enabled, which will, for example, allow machines to multitask in comparison to existing non-simultaneous calling.

16 Claims, 10 Drawing Sheets

(56) References Cited

U.S. PATENT DOCUMENTS

| | | | | |
|---|---|---|---|---|
| 2011/0292841 | A1* | 12/2011 | Sedlacek | H04W 36/0005 370/328 |
| 2012/0166652 | A1* | 6/2012 | Bouthemy | H04L 65/4053 709/227 |
| 2012/0281595 | A1* | 11/2012 | Long | H04L 65/1096 370/259 |
| 2021/0037586 | A1* | 2/2021 | Foti | H04L 65/1073 |

OTHER PUBLICATIONS

Author Unknown, "Technical Specification Group Services and System Aspects; System architecture for the 5G System (5GS); Stage 2 (Release 16)," Technical Specification 23.501, Version 16.7.0, Dec. 2020, 3GPP Organizational Partners, 450 pages.

Author Unknown, "Technical Specification Group Core Network and Terminals; IP multimedia call control protocol based on Session Initiation Protocol (SIP) and Session Description Protocol (SDP); Stage 3 (Release 17)," Technical Specification 24.229, Version 17.1.0, Dec. 2020, 3GPP Organizational Partners, 1,070 pages.

Invitation to Pay Additional Fees and Partial Search for International Patent Application No. PCT/IB2022/050121, mailed Apr. 13, 2022, 13 pages.

International Search Report and Written Opinion for International Patent Application No. PCT/IB2022/050121, mailed Jun. 9, 2022, 18 pages.

* cited by examiner

FIG. 11
17:14
Create new contact
Add to a contact
Video call
Send a message
99585 92443
2
ABC
3
DEF
4
GHI
5
JKL
6
MNO
7
PQRS
8
TUV
9
WXYZ
0

SIMULTANEOUS CALLING IN 5G

RELATED APPLICATIONS

This application is a 35 U.S.C. § 371 national phase filing of International Application No. PCT/IB2022/050121, filed Jan. 7, 2022, which claims the benefit of provisional patent application Ser. No. 63/138,111, filed Jan. 15, 2021, the disclosures of which are hereby incorporated herein by reference in their entireties.

TECHNICAL FIELD

The present disclosure relates to simultaneous calling in a cellular communications system.

BACKGROUND

The Third Generation Partnership Project (3GPP) Fifth Generation (5G) system is designed to extend the traditional cellular communications system to support various new use cases. These new use cases result in new challenges that need to be addressed.

SUMMARY

Systems and methods for simultaneous calling in a cellular communications system are disclosed. In one embodiment, a method performed by a first wireless communication device for simultaneous Internet Protocol (IP) Multimedia Subsystem (IMS) sessions between the first wireless communication device and two or more other wireless communication devices comprises establishing a first IMS session with a second wireless communication device and, while the first IMS session is ongoing and without placing the first IMS session on hold, establishing a second IMS session with a third wireless communication device. In this manner, simultaneous calling is enabled, which will, for example, allow machines to multitask in comparison to existing non-simultaneous calling.

In one embodiment, the first IMS session and the second IMS sessions are simultaneous IMS voice sessions.

In one embodiment, the first IMS session is an IMS voice session, an IMS data session, or an IMS video session, and the second IMS session an IMS voice session, an IMS data session, or an IMS video session, and the first IMS session and the second IMS session are simultaneous IMS sessions. In another embodiment, the first IMS session is an IMS session that supports a combination of two or more of voice, video, and data, and/or the second IMS session an IMS session that supports a combination of two or more of voice, video, and data.

In one embodiment, the simultaneous IMS sessions are permitted only if an associated P-CSCF does not have any policy that prohibits resource reservation for any media for simultaneous IMS sessions initiated or received by the same UE.

Corresponding embodiments of a first wireless communication device are also disclosed. In one embodiment, a first wireless communication device for simultaneous IMS sessions between the first wireless communication device and two or more other wireless communication devices is adapted to establish a first IMS session with a second wireless communication device and, while the first IMS session is ongoing and without placing the first IMS session on hold, establish a second IMS session with a third wireless communication device.

In another embodiment, a first wireless communication device for simultaneous IMS sessions between the first wireless communication device and two or more other wireless communication devices comprises one or more transmitters, one or more receivers, and processing circuitry associated with the one or more transmitters and the one or more receivers. The processing circuitry is configured to cause the first wireless communication device to establish a first IMS session with a second wireless communication device and, while the first IMS session is ongoing and without placing the first IMS session on hold, establish a second IMS session with a third wireless communication device.

Embodiments of a method performed by network node to enable a feature for supporting simultaneous IMS sessions between a first wireless communication device and two or more other wireless communication devices are also disclosed. In one embodiment, a method performed by network node to enable a feature for supporting simultaneous IMS sessions between a first wireless communication device and two or more other wireless communication devices comprises storing a subscription profile associated to a first wireless communication device, the subscription profile comprising information that indicates that the first wireless communication device is associated to a subscription to a simultaneous IMS sessions feature. The method further comprises providing the information to one or more other network nodes.

In one embodiment, the network node is a Home Subscriber Server (HSS).

In one embodiment, the one or more other network nodes comprises an IMS node. In one embodiment, the IMS node is a Serving Call Session Control Function (S-CSCF).

In one embodiment, the one or more other network nodes comprises a network node that hosts a Multimedia Telephony, MMTEL, service.

In one embodiment, the simultaneous IMS sessions are permitted only if an associated Proxy Call Session Control Function (P-CSCF) does not have any policy that prohibits resource reservation for any media for simultaneous IMS sessions initiated or received by the same User Equipment (UE).

Corresponding embodiments of a network node are also disclosed. In one embodiment, a network node for enabling a feature for supporting simultaneous IMS sessions between a first wireless communication device and two or more other wireless communication devices is adapted to store a subscription profile associated to a first wireless communication device, the subscription profile comprising information that indicates that the first wireless communication device is associated to a subscription to a simultaneous IMS sessions feature. The network node is further adapted to provide the information to one or more other network nodes.

In one embodiment, a network node for enabling a feature for supporting simultaneous IMS sessions between a first wireless communication device and two or more other wireless communication devices comprises processing circuitry configured to cause the network node to store a subscription profile associated to a first wireless communication device, the subscription profile comprising information that indicates that the first wireless communication device is associated to a subscription to a simultaneous IMS sessions feature. The network node is further adapted to provide the information to one or more other network nodes.

In another embodiment, a method performed by network node to enable a feature for supporting simultaneous IMS sessions between a first wireless communication device and two or more other wireless communication devices comprises obtaining information that indicates that a first wireless communication device is associated to a subscription to a simultaneous IMS sessions feature and storing the information. The method further comprises, while the first wireless communication device has a first IMS session that is ongoing with a second wireless communication device, receiving a request for establishment of a second IMS session between a second wireless communication device and the first wireless communication device where the second IMS session is simultaneous with the first IMS session, determining that the second IMS session is allowed based on the stored information, and allowing establishment of the second IMS session to continue responsive to determining that the second IMS session is allowed.

In one embodiment, obtaining the information comprises receiving a subscription profile associated to the first wireless communication device from an HSS, the subscription profile comprising the information that indicates that the first wireless communication device is associated to a subscription to the simultaneous IMS sessions feature.

In one embodiment, the network node is an IMS node. In one embodiment, the IMS node is a S-CSCF.

In one embodiment, the network node is a network node that hosts a MMTEL service.

In one embodiment, the first IMS session and the second IMS sessions are simultaneous IMS voice sessions.

In one embodiment, the first IMS session is an IMS voice session, an IMS data session, or an IMS video session, and the second IMS session an IMS voice session, an IMS data session, or an IMS video session, and the first IMS session and the second IMS session are simultaneous IMS sessions. In another embodiment, the first IMS session is an IMS session that supports a combination of two or more of voice, video, and data, and/or the second IMS session an IMS session that supports a combination of two or more of voice, video, and data.

In one embodiment, the simultaneous IMS sessions are permitted only if an associated P-CSCF does not have any policy that prohibits resource reservation for any media for simultaneous IMS sessions initiated or received by the same UE.

Corresponding embodiments of a network node are also disclosed. In one embodiment a network node for enabling a feature for supporting simultaneous IMS sessions between a first wireless communication device and two or more other wireless communication devices is adapted to obtain information that indicates that a first wireless communication device is associated to a subscription to a simultaneous IMS sessions feature and store the information. The network node is further adapted to, while the first wireless communication device has a first IMS session that is ongoing with a second wireless communication device, receive a request for establishment of a second IMS session between a second wireless communication device and the first wireless communication device where the second IMS session being simultaneous with the first IMS session, determine that the second IMS session is allowed based on the stored information, and allow establishment of the second IMS session to continue responsive to determining that the second IMS session is allowed.

In another embodiment a network node for enabling a feature for supporting simultaneous IMS sessions between a first wireless communication device and two or more other wireless communication devices comprises processing circuitry configured to cause the network node to obtain information that indicates that a first wireless communication device is associated to a subscription to a simultaneous IMS sessions feature and store the information. The processing circuitry is further configured to cause the network node is further adapted to, while the first wireless communication device has a first IMS session that is ongoing with a second wireless communication device, receive a request for establishment of a second IMS session between a second wireless communication device and the first wireless communication device where the second IMS session being simultaneous with the first IMS session, determine that the second IMS session is allowed based on the stored information, and allow establishment of the second IMS session to continue responsive to determining that the second IMS session is allowed.

In another embodiment, a method performed by a first wireless communication device for enabling simultaneous IMS sessions between the first wireless communication device and two or more other wireless communication devices comprises sending information towards an IMS node that indicates that the first wireless communication device supports simultaneous IMS sessions and receiving information from the IMS node that indicates that a respective IMS supports simultaneous IMS sessions.

In one embodiment, the method further comprises establishing a first IMS session with a second wireless communication device and, responsive to receiving the information from the IMS node that indicates that the respective IMS supports simultaneous IMS sessions, while the first IMS session is ongoing and without placing the first IMS session on hold, establishing a second IMS session with a third wireless communication device.

In one embodiment, the first IMS session and the second IMS sessions are simultaneous IMS voice sessions.

In one embodiment, the first IMS session is an IMS voice session, an IMS data session, or an IMS video session, and the second IMS session an IMS voice session, an IMS data session, or an IMS video session, and the first IMS session and the second IMS session are simultaneous IMS sessions. In another embodiment, the first IMS session is an IMS session that supports a combination of two or more of voice, video, and data, and/or the second IMS session an IMS session that supports a combination of two or more of voice, video, and data.

In one embodiment, the information that indicates that the first wireless communication device supports simultaneous IMS sessions is comprised in an IMS registration request.

In one embodiment, the information that indicates that the first wireless communication device supports simultaneous IMS sessions is comprised in a SIP 200 OK response.

In one embodiment, the simultaneous IMS sessions are permitted only if an associated P-CSCF does not have any policy that prohibits resource reservation for any media for simultaneous IMS sessions initiated or received by the same UE.

Corresponding embodiments of a first wireless device are also disclosed. In one embodiment, a first wireless communication device for enabling simultaneous IMS sessions between the first wireless communication device and two or more other wireless communication devices is adapted to send information towards an IMS node that indicates that the first wireless communication device supports simultaneous IMS sessions and receive information from the IMS node that indicates that a respective IMS supports simultaneous IMS sessions.

In one embodiment, a first wireless communication device for enabling simultaneous IMS sessions between the first wireless communication device and two or more other wireless communication devices comprises one or more transmitters, one or more receivers, and processing circuitry associated with the one or more transmitters and the one or more receivers. The processing circuitry is configured to cause the first wireless communication device to send information towards an IMS node that indicates that the first wireless communication device supports simultaneous IMS sessions and receive information from the IMS node that indicates that a respective IMS supports simultaneous IMS sessions.

Embodiments of a method performed by an IMS node are also disclosed. In one embodiment, a method performed by an IMS node for enabling simultaneous IMS sessions between a first wireless communication device and two or more other wireless communication devices comprises receiving information from a first wireless communication device supports simultaneous IMS sessions and sending, to the first wireless communication device, information that indicates whether a respective IMS supports simultaneous IMS sessions.

In one embodiment, the simultaneous IMS sessions are simultaneous IMS voice sessions.

In one embodiment, the simultaneous IMS sessions comprise at least two IMS sessions each being an IMS voice session, an IMS data session, or an IMS video session. In another embodiment, the simultaneous IMS sessions comprise at least two IMS sessions at least one of which supports a combination of at least two of voice, video, and data.

In one embodiment, the information that indicates that the first wireless communication device supports simultaneous IMS sessions is comprised in an IMS registration request.

In one embodiment, the information that indicates that the first wireless communication device supports simultaneous IMS sessions is comprised in a SIP 200 OK response.

In one embodiment, the simultaneous IMS sessions are permitted only if an associated P-CSCF does not have any policy that prohibits resource reservation for any media for simultaneous IMS sessions initiated or received by the same UE.

Corresponding embodiments of a network node are also disclosed. In one embodiment, a network node that implements an IMS node for enabling simultaneous IMS sessions between a first wireless communication device and two or more other wireless communication devices is adapted to receive information from a first wireless communication device supports simultaneous IMS sessions and send, to the first wireless communication device, information that indicates whether a respective IMS supports simultaneous IMS sessions.

In another embodiment, a network node that implements an IMS node for enabling simultaneous IMS sessions between a first wireless communication device and two or more other wireless communication devices comprises processing circuitry configured to cause the network node to receive information from a first wireless communication device supports simultaneous IMS sessions and send, to the first wireless communication device, information that indicates whether a respective IMS supports simultaneous IMS sessions.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
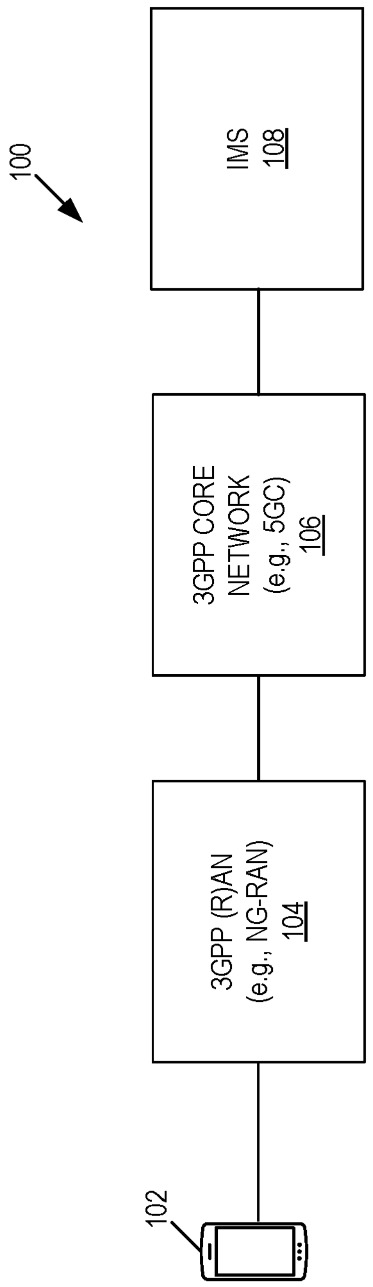
FIG. 1 illustrates one example of a wireless communication system in which embodiments of the present disclosure may be implemented.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s). The 5G system enables connectivity of machine type devices (e.g., self-driving cars, robotics, etc.). These machine type devices have capabilities that extend beyond the capabilities of humans in terms of the amount of information that the machines can simultaneously process. In this regard, there are new challenges that need to be addressed in the 5G system to enable the full use of the capabilities of machine type devices. The inventors have recognized that there is a need to enable simultaneous (separate) calls (i.e., separate call sessions) between a machine and multiple called entities (e.g., UEs of multiple humans). A discussion of simultaneous calling is provided in the following use case description.

Use Case: Simultaneous Calling

Today, a smartphone functions in a way where you can make one call at a time. That is, as you dial and make a call to another number, only one call is getting connected and communication is possible. It is not possible for the user to make multiple calls to different numbers all at same time from his/her smartphone. But for many devices (e.g., vehicle, robots, etc.) joining the calling ecosystem, new requirements may surface. A requirement for a UE to allow making multiple calls to different numbers all at the same time and communicating with same over voice calls will likely arise. Today, such simultaneous calling is not possible, as once a user tries another call during first ongoing call, the first call goes "on hold". Humans need a single call session to communicate, but machines do not have this limitation.

Note that the simultaneous call use case is not to be confused with a call conferencing use case where everyone can talk and listen over the same conference call session and all callers are present in same conference call.

Machines (e.g., UEs) with calling capabilities will be deployed in different industries and domains in 5G to support different communication needs. Some examples are described below.

Car sharing is an important use case in future cars. Multiple humans sharing a single car for their journey to the same location or different destinations. It is possible that a self-driving car would like to talk to individual humans over separate voice calls such that a unique call session needs to be established between the car and each individual human. For instance, the car may want to make (user specific) announcement so other users cannot listen to the announcements of other users. Today, making such calls at the same time is not possible. In other words, it is not possible for a self-driving car (UE) to make simultaneous calls to multiple individuals UEs all at same time.

In robotic society, a robot (UE) may need a way to establish multiple call sessions all at once with multiple UEs over voice call, where it may need to share UE specific information over the voice calls at same time. One by one calling will slow down the voice communication process. Thus, simultaneous calling is what is needed here.

Smart devices with calling capabilities deployed at home, industries, or verticals would like to have a simultaneous calling feature to support different communication needs. Machines can scale in communication scenarios which are not possible today.

Machines having the calling capability can multitask in comparison to humans. A human can speak to one person at a time as the human's mind listens and processes information. But a machine does not have the same limitations as a human. A machine can process a large amount of information at the same time. So, simultaneous calling is what a machine will need.

A machine does not need to listen to audible sounds, meaning that a voice conversation over a voice session can be converted from voice to text when flowing from a human to the machine and from text to voice when flowing from the machine to a human. Thus, a machine caller can just convert text to voice towards human caller 1, and similarly towards other multiple human callers being dialed at same time. So, when the machine makes multiple calls towards multiple UEs at the same time, all sessions can go live at the same time without the need to put anyone on hold as happens today. So, a voice to text conversion is done in the human-to-machine communication over a voice call session, and a text to voice conversion is done in the machine-to-human communication scenario over the voice call session. So, in a multithreaded environment, each thread at the machine can make a call and communicate text to voice towards specific human UEs and communicate with them over unique voice call sessions all at same time over voice calls.

Additionally, the dialer application used by today's smartphones does not have the ability to type multiple mobile numbers to dial at one time as a list, in order to setup simultaneous calls from a UE. This list may be, for example, <mobile number #1>;<mobile number #2>;<mobile number #3>;<mobile number #4>; where ';' is record separator between different mobile numbers that the machine wants to dial at one time to setup simultaneous calls.

Figure 11:
FIG. 11 illustrates one example of a smartphone dialer application on an existing smartphone.

Today, using the smartphone's dialer application, a user is able to type only one number at a time. FIG. 11 illustrates one example of a smartphone dialer application on an existing smartphone.

Certain aspects of the present disclosure and their embodiments may provide solutions to the aforementioned or other challenges. The present disclosure provides systems and methods for enabling simultaneous calling in a cellular communications system, such as a 5G system. However, the systems and methods disclosed herein are equally applicable to other types of cellular communications systems (e.g., other 3GPP cellular communications systems such as, e.g., Universal Terrestrial Mobile Telecommunications System (UMTS)).

Two options are provided. These options are:

Option 1: In some embodiments, a subscription-based solution is provided that introduces a new subscription feature in the Home Subscriber Server (HSS) to enable subscribers wanting to initiate simultaneous Internet Protocol (IP) Multimedia Subsystem (IMS) voice calls to do so without the current restrictions of needing to put all ongoing IMS sessions on hold to establish an additional IMS voice session. Hence, for these subscribers, they will be able to initiate as many IMS voice sessions as they want with the appropriate Quality of Service (QoS) resources per IMS session through the new subscription feature in HSS. The same applies to originating or terminating sessions for a subscriber that has such a subscription. In other words, the network will not need to put a UE engaged in an IMS session on hold to deliver a new voice IMS session. Call flow diagrams are included and described below to illustrate example embodiments of Option 1.

Option 2: In some embodiments, a solution is provided that allow UEs supporting simultaneous IMS voice sessions to request an additional IMS voice session(s) when they want if the IMS network supports this feature. In one embodiment, at IMS registration, a UE indicates if it supports simultaneous IMS voice sessions through the inclusion of a new feature tag for simultaneous IMS Voice sessions. The network responds in the 200 OK response in the Feature-Caps header if this feature is supported; otherwise, the UE assumes that this feature is not supported by the IMS network. The UE then knows that the IMS network can or cannot handle simultaneous IMS voice sessions. In one embodiment, the Serving Call Session Control Function (S-CSCF) is the entity responsible to include in the Feature-Caps header support for simultaneous IMS voice sessions feature. The S-CSCF is configured for that support, if indeed it supports the feature. It is assumed that Multimedia Telephony (MMTEL) service supports this feature as well for a S-CSCF to indicate support of this feature in the Feature-Caps included in the 200 Ok response.

Note that in Option 2 not all S-CSCFs need to support the simultaneous IMS voice sessions feature. Only S-CSCFs that support this feature will include indication of support for this feature in the Feature-Caps header. Otherwise, the S-CSCF allocated to the UE at initial IMS registration will not include such support, if it is not configured to support it. In this case, the UE is aware that it can only request simultaneous multiple voice sessions based on existing procedures, i.e. put all voice sessions on hold before initiating a new IMS voice session.

Note that for both Option 1 and Option 2, the MMTEL does not do anything special to support the simultaneous IMS voice session feature. Some implementations may still require the subscriber profile in the MMTEL to include subscription (option1) or be configured (Option 2). In other implementations, the MMTEL can be completely transparent to the feature.

There are, proposed herein, various embodiments which address one or more of the issues disclosed herein. In one embodiment, a method performed by a first wireless communication device for simultaneous IMS sessions between the first wireless communication device and two or more other wireless communication devices comprises establishing a first IMS session with a second wireless communication device and, while the first IMS session is ongoing and without placing the first IMS session on hold, establishing a second IMS session with a third wireless communication device. In one embodiment, the first IMS session and the second IMS sessions are simultaneous IMS voice sessions. In another embodiment, the first IMS session is an IMS voice session, an IMS data session, or an IMS video session, and the second IMS session an IMS voice session, an IMS data session, or an IMS video session, and the first IMS session and the second IMS session are simultaneous IMS sessions.

In one embodiment, a method performed by network node to enable a feature for supporting simultaneous IMS sessions between a first wireless communication device and two or more other wireless communication devices comprises storing a subscription profile associated to a first wireless communication device, the subscription profile comprising information that indicates that the first wireless communication device is associated to a subscription to a simultaneous IMS sessions feature. The method further comprises providing the information to one or more other network nodes. In one embodiment, the network node is an HSS. In one embodiment, the one or more other nodes comprises an IMS node. In one embodiment, the IMS node is a S-CSCF. In one embodiment, the one or more other network nodes comprises a network node that hosts a MMTEL service.

In one embodiment, method performed by a network node to enable a feature for supporting simultaneous IMS sessions between a first wireless communication device and two or more other wireless communication devices comprises obtaining information that indicates that a first wireless communication device is associated to a subscription to a simultaneous IMS sessions feature and storing the information. The method further comprises, while the first wireless communication device has a first IMS session that is ongoing with a second wireless communication device, receiving a request for establishment of a second IMS session between a second wireless communication device and the first wireless communication device, the second IMS session being simultaneous with the first IMS session, determining that the second IMS session is allowed based on the stored information, and allowing establishment of the second IMS session to continue responsive to determining that the second IMS session is allowed. In one embodiment, the first IMS session and the second IMS sessions are simultaneous IMS voice sessions. In another embodiment, the first IMS session is an IMS voice session, an IMS data session, or an IMS video session, and the second IMS session an IMS voice session, an IMS data session, or an IMS video session, and the first IMS session and the second IMS session are simultaneous IMS sessions.

In one embodiment, obtaining the information comprises receiving a subscription profile associated to the first wireless communication device from an HSS, the subscription profile comprising the information that indicates that the first wireless communication device is associated to a subscription to the simultaneous IMS sessions feature.

In one embodiment, the network node is an IMS node. In one embodiment, the IMS node is a S-CSCF. In one embodiment, the network node is a network node that hosts a MMTEL service.

In one embodiment, a method performed by a first wireless communication device for enabling simultaneous IMS sessions between the first wireless communication device and two or more other wireless communication devices comprises sending information towards an IMS node that indicates that the first wireless communication device supports simultaneous IMS sessions and receiving information from the IMS node that indicates that a respective IMS supports simultaneous IMS sessions. In one embodiment, the method further comprises establishing a first IMS session with a second wireless communication device and, responsive to receiving the information from the IMS node that indicates that the respective IMS supports simultaneous IMS sessions, while the first IMS session is ongoing and without placing the first IMS session on hold, establishing a second IMS session with a third wireless communication device. In one embodiment, the first IMS session and the second IMS sessions are simultaneous IMS voice sessions. In another embodiment, the first IMS session is an IMS voice session, an IMS data session, or an IMS video session, and the second IMS session an IMS voice session, an IMS data session, or an IMS video session, and the first IMS session and the second IMS session are simultaneous IMS sessions. In one embodiment, the information that indicates that the first wireless communication device supports simultaneous IMS sessions is comprised in an IMS registration request. In one embodiment, the information that indicates that the respective IMS supports simultaneous IMS sessions is comprised in a SIP 200 OK response.

In one embodiment, a method performed by an IMS node for enabling simultaneous IMS sessions between a first wireless communication device and two or more other wireless communication devices comprising receiving information from a first wireless communication device supports simultaneous IMS sessions and sending, to the first wireless communication device, information that indicates whether a respective IMS supports simultaneous IMS sessions. In one embodiment, the first IMS session and the second IMS sessions are simultaneous IMS voice sessions. In another embodiment, the first IMS session is an IMS voice session, an IMS data session, or an IMS video session, and the second IMS session an IMS voice session, an IMS data session, or an IMS video session, and the first IMS session and the second IMS session are simultaneous IMS sessions. In one embodiment, the information that indicates that the first wireless communication device supports simultaneous IMS sessions is comprised in an IMS registration request. In one embodiment, the information that indicates that the respective IMS supports simultaneous IMS sessions is comprised in a SIP 200 OK response.

Certain embodiments may provide one or more of the following technical advantage(s). Some example advantages that may be provided by at least some of the embodiments disclosed herein include the following:

1. Simultaneous calling will allow machines to multitask in comparison to existing state of the art. It will allow UE to make multiple call sessions at a time.
2. Businesses using machines (UEs) with simultaneous calling capabilities will raise revenue margins, allowing machines multi-tasking in communication with different UEs. Third parties can automate communication related tasks with respect to machines (UEs) with calling capabilities. Machines do not suffer from limitation to focus on one call at a time, to listen and process information like humans do, therefore they can scale multifold in comparison to humans. Simultaneous calling will enable the same.
3. Robots, vehicles, smart devices are some examples of UEs with calling capabilities highlighted in the simultaneous calling use case, but the list is not limited to these.
4. 5G operators can benefit from additional revenue. In different industries and domains deploying devices (UEs) with calling capabilities, simultaneous calling will help increase revenue margins. Billions of devices joining the 5G ecosystem as part of different industries and domains will therefore benefits from this scalable simultaneous calling feature.

FIG. 1 illustrates one example of a wireless communication system 100 in which embodiments of the present disclosure may be implemented. Within the wireless communication system 100, a UE 102 has radio access to a cellular access network, which is shown as a 3GPP (Radio) Access Network ((R)AN) 104. The 3GPP (R)AN 104 is connected to a 3GPP core network 106. In one example embodiment, the 3GPP (R)AN 104 is, in one example, a Next Generation RAN (NG-RAN) including 5G NR base stations (gNBs) providing NR user plane and control plane services towards the UE 102 and optionally Next Generation eNBs (ng-eNBs) providing LTE/E-UTRAN services towards the UE 102, and the 3GPP core network 106 is a 5G Core (5GC) (see, e.g., FIG. 2 where the 5GC 200 is shown). Together, the NG-RAN and the 5GC form a 5G system (5GS). In another example embodiment, the 3GPP (R)AN 104 is a E-UTRAN included eNBs providing LTE/E-UTRAN services towards the UE 102, and the 3GPP core network 106 is an Evolved Packet Core (EPC) (see, e.g., FIG. 3 where the EPC 300 is shown). Together, the E-UTRAN and the EPC form an Evolved Packet System (EPS). The 3GPP core network(s) 106 is connected to an Internet Protocol (IP) Multimedia Subsystem (IMS) 108, as will be appreciated by one of skill in the art.

Figure 2:
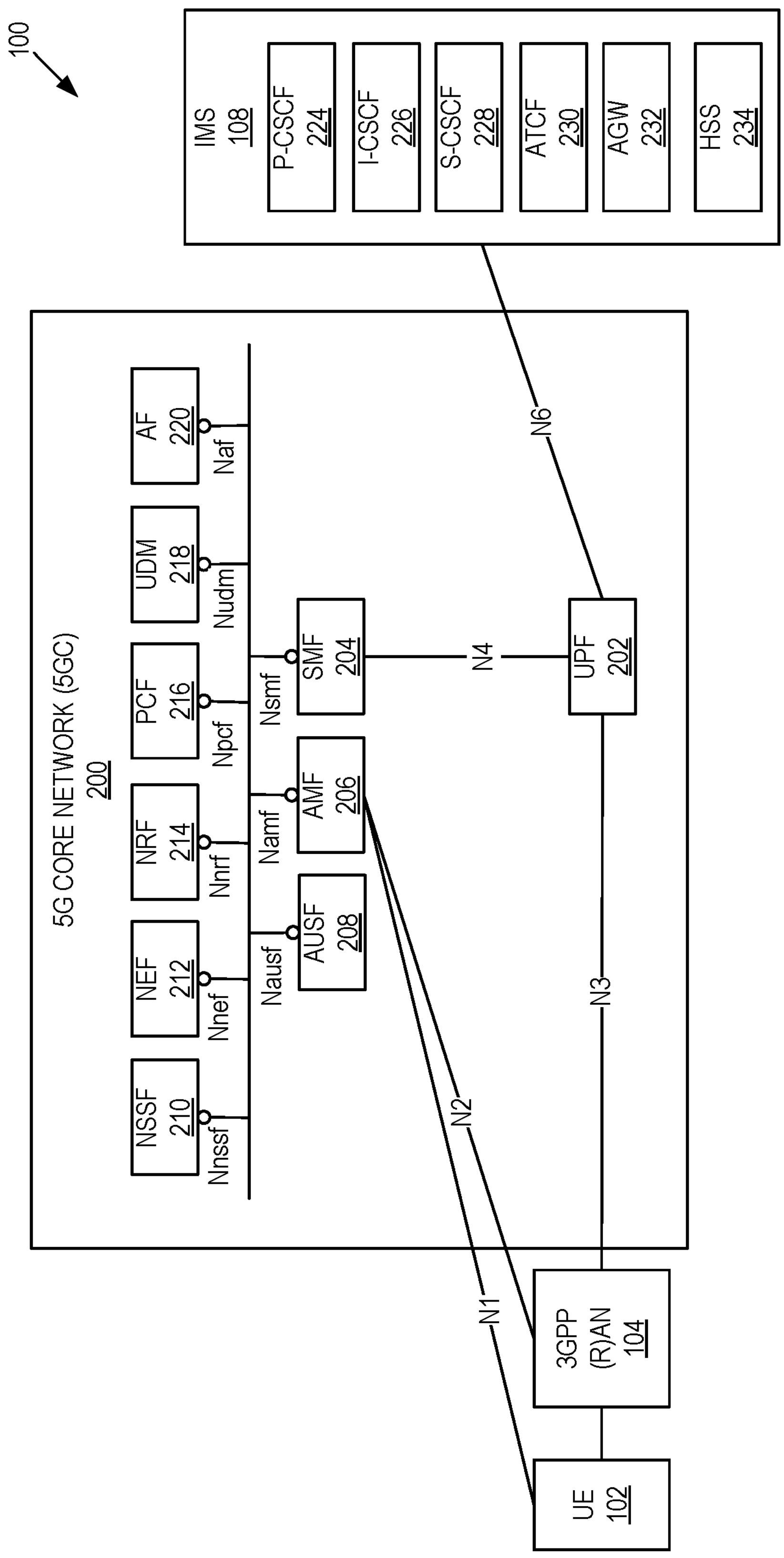
FIGS. 2 and 3 illustrate two specific examples of the wireless communication system of FIG. 1.
Figure 3:
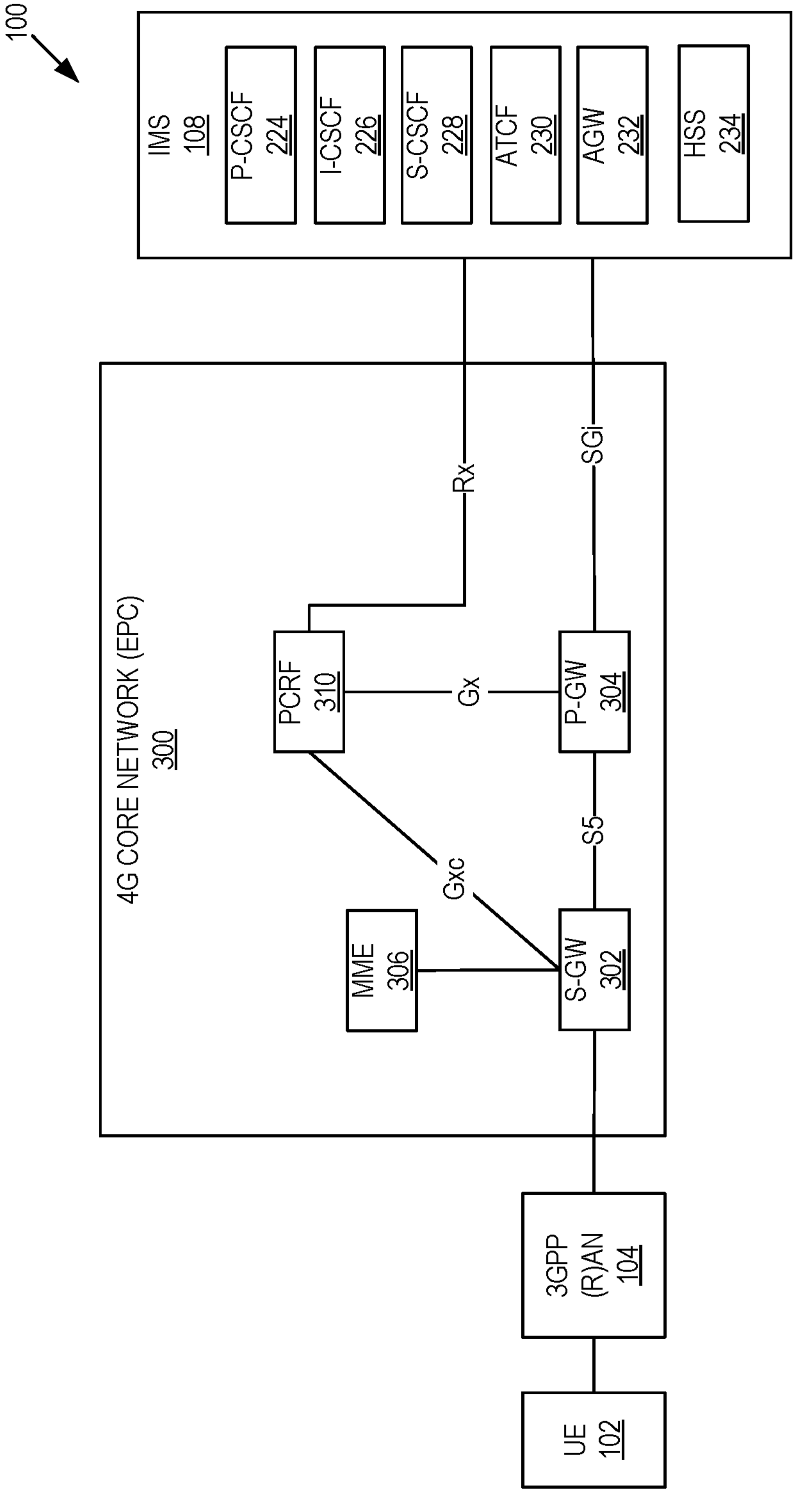

FIGS. 2 and 3 illustrate two specific examples of the wireless communication system 100 of FIG. 1. Specifically, FIG. 2 illustrates an example in which the 3GPP (R)AN 104 is a NG-RAN and the 3GPP core network 106 is an 5GC, which is referenced as 5GC 200. Conversely, FIG. 3 illustrates an example in which the 3GPP (R)AN 104 is an E-UTRAN and the 3GPP core network 106 is an EPC, which is referenced as EPC 300.

Looking first at FIG. 2, as will be appreciated by one of skill in the art, the 5GC 200 includes a number of Network Functions (NFs) connected by service-based interfaces in the control plane. An NF may be implemented either as a network element on a dedicated hardware, as a software instance running on a dedicated hardware, or as a virtualized function instantiated on an appropriate platform, e.g., a cloud infrastructure. As illustrated, the 5GC 200 includes a UPF 202, an SMF 204, an AMF 206, an AUSF 208, a NSSF 210, a NEF 212, a NRF 214, a PCF 216, a UDM 218, and an Application Function (AF) 220.

Note that while FIG. 2 illustrates the 5GC 200 as a service-based architecture, a reference point representation may alternatively be used. Reference point representations of the 5G network architecture are used to develop detailed call flows in the normative standardization.

The 5GC 200 aims at separating a user plane and a control plane. The user plane carries user traffic while the control plane carries signaling in the network. In FIG. 2, the UPF 202 is in the user plane and all other NFs, i.e., the SMF 204, AMF 206, AUSF 208, NSSF 210, NEF 212, NRF 214, PCF 216, UDM 218, and AF 220, are in the control plane. Separating the user and control planes guarantees each plane resource to be scaled independently. It also allows UPFs 202 to be deployed separately from control plane functions in a distributed fashion. In this architecture, the UPFs 202 may be deployed very close to UEs 102 to shorten the Round Trip Time (RTT) between the UEs 102 and the data network for some applications requiring low latency.

The core 5G network architecture is composed of modularized functions. For example, the AMF 206 and SMF 204 are independent functions in the control plane. Separating the AMF 206 and SMF 204 allows for independent evolution and scaling. Other control plane functions like the PCF 216 and AUSF 208 can be separated as shown in FIG. 2. Modularized function design enables the 5G core network to support various services flexibly.

Each NF interacts with another NF directly. It is possible to use intermediate functions to route messages from one NF to another NF. In the control plane, a set of interactions between two NFs is defined as a service so that its reuse is possible. This service enables support for modularity. The user plane supports interactions such as forwarding operations between different UPFs 202.

The service(s) that an NF provides to other authorized NFs can be exposed to the authorized NFs through the service-based interface. In FIG. 2, the service-based interfaces are sometimes indicated by the letter "N" followed by the name of the NF (e.g., Namf for the service based interface of the AMF 206 and Nsmf for the service based interface of the SMF 204, etc.). Note that not all "N" interfaces are service based interfaces (e.g., N1, N2, and N4 are not service based interfaces).

Some properties of the NFs shown in FIG. 2 may be described in the following manner; however, the interested reader can find additional details in 3GPP Technical Specification (TS) 23.501. The AMF 206 provides UE-based authentication, authorization, mobility management, etc. A UE 102 even using multiple access technologies is basically connected to a single AMF 206 because the AMF 206 is independent of the access technologies. The SMF 204 is responsible for session management and allocates IP addresses to UEs 102. It also selects and controls the UPF 202 for data transfer. If a UE 102 has multiple sessions, different SMFs 204 may be allocated to each session to manage them individually and possibly provide different functionalities per session. The AF 220 provides information on the packet flow to the PCF 216 responsible for policy control in order to support Quality of Service (QoS). Based on the information, the PCF 216 determines policies about mobility and session management to make the AMF 206 and SMF 204 operate properly. The AUSF 208 supports an authentication function for the UEs 102 or similar and thus stores data for authentication of the UEs 102 or similar while the UDM 218 stores subscription data of the UE 102.

As will be understood by those of skill in the art, the IMS 108 includes various IMS entities such as, for example, a Proxy Call Session Control Function (P-CSCF) 224, an Interrogating Call Session Control Function (I-CSCF) 226, a Serving Call Session Control Function (S-CSCF) 228, an Access Transfer Control Function (ATCF) 230, an Access Gateway (AGW) 232, and a Home Subscriber Server (HSS) 234. The operational details of the P-CSCF 224, the I-CSCF 226, the S-CSCF 228, the ATCF 230, the AGW 232, and the HSS 234 are well known to those of skill in the art and are therefore not described here.

Now turning to FIG. 3, as will be appreciated by one of skill in the art, the EPC 300 includes a number of core network entities such as, e.g., a Serving Gateway (S-GW) 302, a P-GW 304, an MME 306, and a Policy and Charging Rules Function (PCRF) 310. The operational details of the S-GW 302, the P-GW 304, the MME 306, the and the PCRF 310 are well known to those of skill in the art and therefore are not repeated here.

Now, embodiments of systems and methods for enabling simultaneous calling in the wireless communications system 100 will be described. This description is provided with respect two solutions referred to as "Option 1" and "Option 2".

Option 1

The following description of the solution for Option 1 is provide in the context of enabling simultaneous calls, or simultaneous IMS voice sessions, between a first UE 102, denoted as UE 102*a* or UEa, and two other UEs 102, denoted as UEs 102*b* and 102*c* or UEb and UEc. While the following description focuses on enabling two simultaneous IMS voice sessions, there can be any number of two or more simultaneous IMS voice sessions.

Figure 4A:
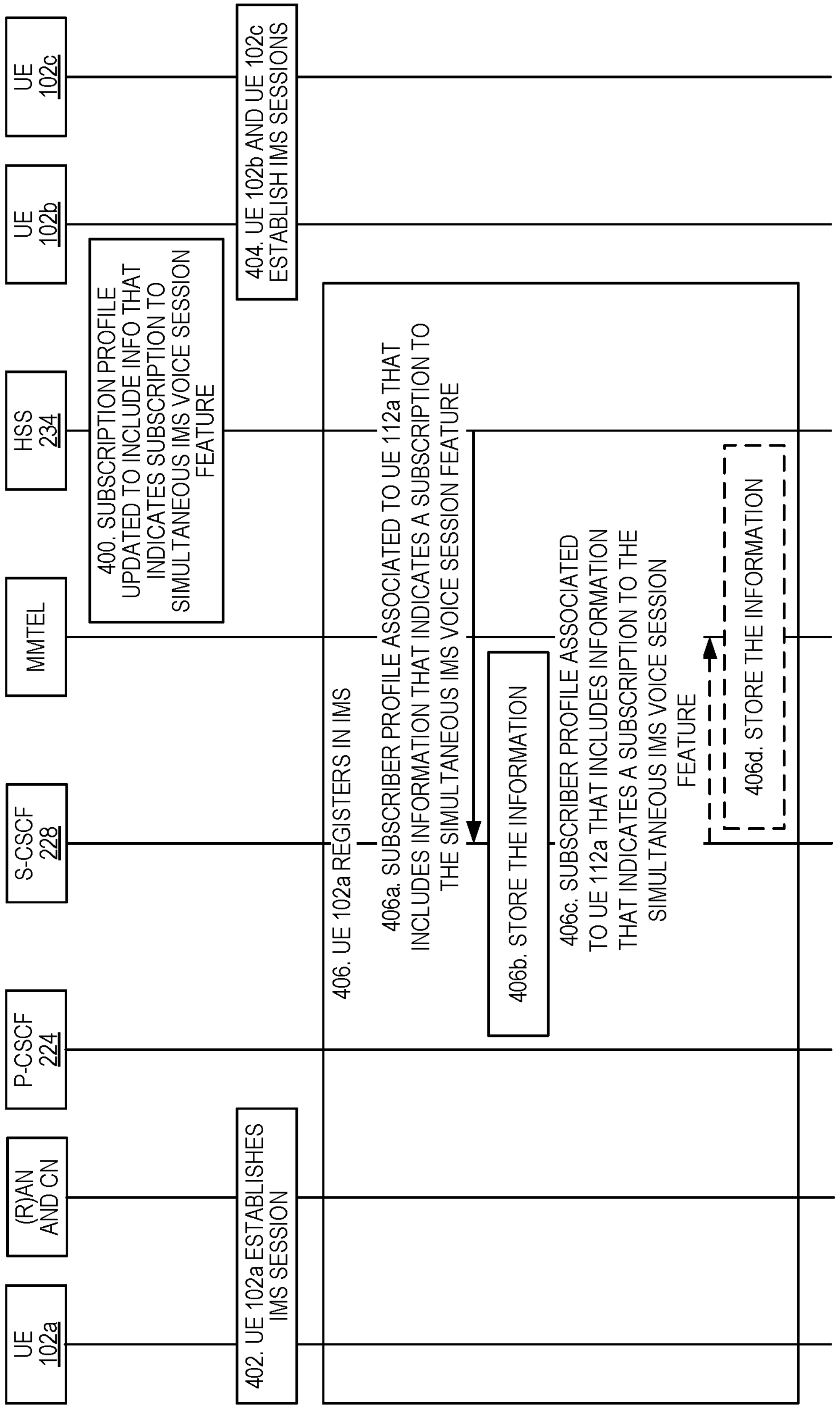
FIGS. 4A and 4B illustrate a procedure that enables simultaneous IMS voice sessions in accordance with one embodiment of the present disclosure.
Figure 4B:
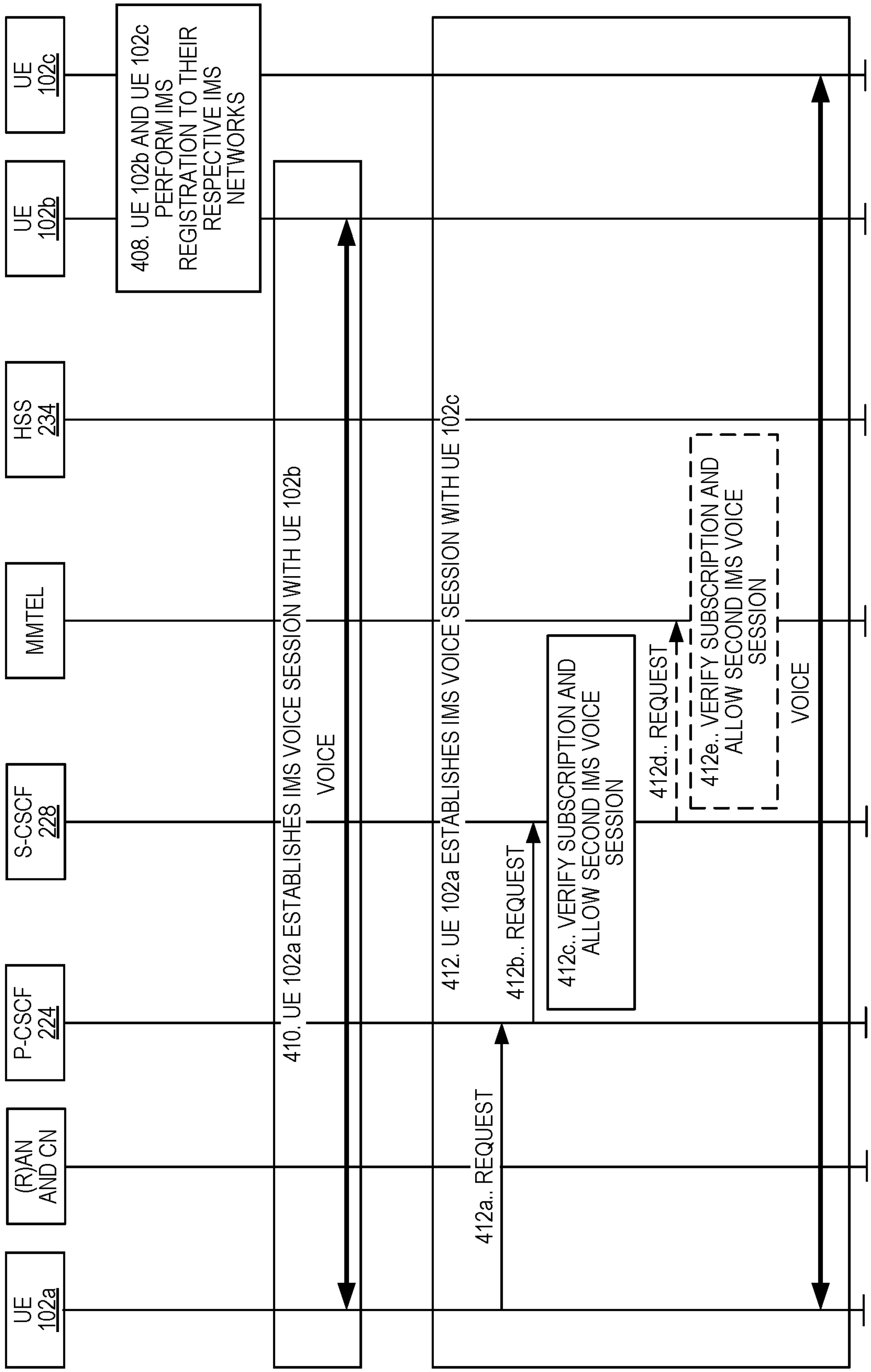

FIGS. 4A and 4B illustrate a procedure that enables simultaneous IMS voice sessions in accordance with one embodiment of the present disclosure. In this example embodiment, simultaneous IMS voice sessions are enabled between UE 102*a* and UEs 102*b* and 102*c*. In particular, the UE 102*a* has a subscription for simultaneously initiating multiple IMS voice sessions to UE 102*b* and UE 102*c*. The steps of the procedure are as follows.

Step 400: In step 400, HSS 234 is provisioned with subscribers that are subscribed to a new subscription feature for simultaneous IMS voice sessions. Note that, in some implementations of the 5GS, the HSS 234 may be co-located with the UDM 218 but is not limited thereto. Further, in the 4G scenario, the HSS 234 may also be viewed as part of the EPC.

Step 402: In step 402, UE 102*a* establishes an IMS PDU session with its IMS 108. UE 102*a* has already successful registered in 5GC, which is not shown in the FIGS. 4A and 4B.

Step 404: In step 404, UE 102*b* and UE 102*c* establish their own IMS PDU sessions, after successfully registering in 5GC which is not shown in the Figure. The IMS network(s) of the UEs 102*b* and 102*c* could be the same IMS network as that of the UE 102*a* or different IMS networks.

Step 406: In step 406, the UE 102*a* registers in the IMS 108. This is a regular IMS registration extended with some additional information elements (IEs) in the existing steps as follows. First, the HSS 234 returns to the S-CSCF 228 a subscriber profile associated to the UE 102*a*, but the subscriber profile now includes information that indicates that the subscriber associated to the UE 102*a* is subscribed to the simultaneous IMS voice sessions feature if applicable (step 406*a*). In this example embodiment, the subscriber profile associated to the UE 102*a* indicates that the subscriber associated to the UE 102*a* is subscribed to the simultaneous IMS voice sessions feature. Next, the S-CSCF 228 stores this new information and applies this new information when needed during session establishment (step 406*b*). The MMTEL stores the new information when the MMTEL receives the information in a third-party Registration from the S-CSCF 228 to apply the new information when it is needed (steps 406*c* and 406*d*). Hence, the S-CSCF 228 and the MMTEL are configured to understand and use this new information. Note that MMTEL support is optional and may not be needed as described above.

Step 408: In step 408, both the UE 102*b* and the UE 102*c* perform IMS registration in their respective IMS networks.

Step 410: In step 410, the UE 102*a* establishes an IMS voice session with the UE 102*b* as per existing procedures (e.g., as described in 3GPP TS 23.228 and TS 24.229).

Step 412: In step 412, the UE 102*a* establishes a second, simultaneous IMS voice session with the UE 102*c*. Thus, the two IMS voice sessions are simultaneous IMS voice sessions between the UE 102*a* and the UEs 102*b* and 102*c*. Further, in one embodiment, these two IMS voice sessions may be initiated at the UE 102*a* simultaneously (e.g., by a list of dialed phone numbers). Here, some details are shown to illustrate additional processing in the nodes relative to the conventional IMS voice session establishment procedure (e.g., as described in 3GPP TS 23.228 and TS 24.229). As illustrated, an IMS session establishment request is sent from the UE 102*a* to the S-CSCF 228 via the RAN 104, the core network 106, and the P-CSCF 224 (steps 412*a* and 412*b*). The S-CSCF 228 verifies that the UE 102*a* is subscribed to the simultaneous IMS voice sessions feature based on the stored information from step 406*b*) and, as such, enables the progression of the establishment of the second, simultaneous IMS voice session (step 412*c*). In one embodiment, the S-CSCF 228 allows the establishment of the second, simultaneous IMS voice session if the subscription to the simultaneous IMS voice sessions features is verified and the UE 102*a* did not put the ongoing IMS voice session with the UE 102*b* on hold; otherwise, the S-CSCF 228 rejects the second, simultaneous IMS voice session to the UE 102*c* based on existing procedure. In one embodiment, the MMTEL will do the same thing as well, but this is optional, and MMTEL may be completely transparent in some implementations (steps 412*d* and 412*e*). Session establishment then proceeds based on existing procedures.

Option 2

Figure 5:
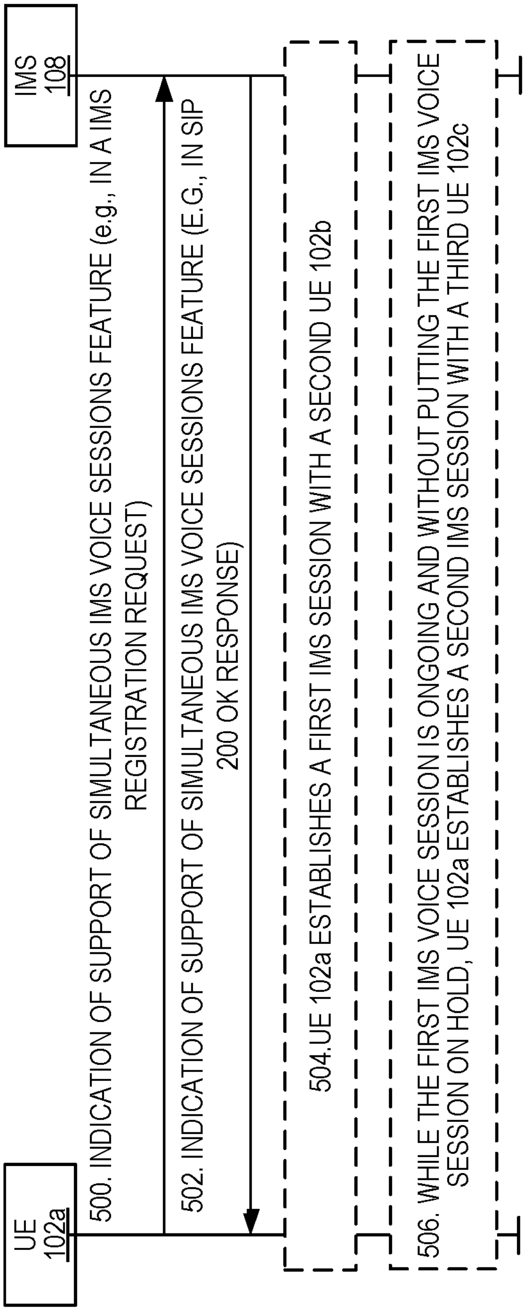
FIG. 5 illustrates the operation of an IMS node and a User Equipment (UE) in accordance with one embodiment of the present disclosure.

In some embodiments, this solution allows a UE 102*a* supporting simultaneous IMS voice sessions to request an additional IMS voice session(s) when its wants if the IMS 108 support this feature. As illustrated in FIG. 5, in one embodiment, at IMS registration, the UE 102*a* indicates if it supports simultaneous IMS voice sessions through the inclusion of a new feature tag for simultaneous IMS Voice sessions, e.g., in the IMS Registration Request (step 500). The IMS 108 responds with information that indicates that it supports the simultaneous IMS voice sessions feature, if supported (e.g., in the 200 OK response to the IMS Registration Request in the Feature-Caps header if this feature is supported) (step 502); otherwise, the UE 102*a* assumes that this feature is not supported by the IMS 108. The UE 102*a* then knows that the IMS 108 can or cannot handle simultaneous IMS voice sessions. In one embodiment, the S-CSCF 228 is the entity responsible to include in the Feature-Caps header support for simultaneous IMS voice sessions feature. The S-CSCF 228 is configured for that support, if indeed it supports the feature. It is assumed that MMTEL supports this feature as well for the S-CSCF 228 to indicate support of this feature in the Feature-Caps included in the 200 Ok response. Subsequently, the UE 102*a* may establish a first IMS voice session with the second UE 102*b* (step 504). Then, responsive to both the UE 102*a* and the IMS 108 supporting simultaneous IMS voice sessions, the UE 102*a* may, while the first IMS voice session is ongoing and without placing the first IMS voice session on hold, establish a second IMS voice session with the third UE 102*c* (step 506).

Note that in Option 2 not all S-CSCFs need to support the simultaneous IMS voice sessions feature. Only S-CSCFs that support this feature will include indication of support for this feature in the Feature-Caps header. Otherwise, the S-CSCF allocated to the UE at initial IMS registration will not include such support if it is not configured to support it. In this case, the UE is aware that it can only request simultaneous multiple voice sessions based on existing procedures, i.e. put all voice sessions on hold before initiating a new IMS voice session.

A description of the behavior of the S-CSCF 228 that support the behavior of Option 2 as compared to that of Option 1 will now be provided.

Looking at FIG. 4B, when the UE 102*a* supporting the simultaneous IMS voice sessions feature is allocated an S-CSCF, the S-CSCF 228 supporting this feature is allocated. Then, when the UE 102*a* initiates the IMS voice session to the UE 102*c*, the S-CSCF 228 does not need to verify any subscription. Rather, the S-CSCF 228 proceeds with establishment of the IMS voice session as per existing procedures since it is configured to support the feature. This configuration allows the S-CSCF 228 to progress the session, etc. The same behavior is applied in case of MMTEL. Also, for terminating calls to a UE engaged in IMS session, the S-CSCF 228 would not put the ongoing IMS voice session on hold prior to progressing the IMS session to the target UE.

As previously indicated, if the S-CSCF 228 does not support the simultaneous IMS voice sessions feature, the S-CSCF 228 would expect the UE 102*a* to put the ongoing IMS voice session on hold before progressing the new IMS session. The same applies for a terminating session to the UE.

In either of the of the above options, the P-CSCF 224 must not have any policies prohibiting the resource reservation for any media for simultaneous sessions initiated or received by the same UE.

Note that although the embodiments above have been described for IMS voice sessions, the embodiments above can equally apply to other types of IMS sessions such as video sessions, a mixture of audio sessions and video sessions, or data, as long as all elements indicate such support. This also applies to IMS session that support a combination of two or more of: voice, video, and data. This may require additional granularity to define the types of sessions supported for simultaneous IMS sessions. For example, in the solution of Option 1, enumeration may be added to the new subscription feature in the HSS 234 describing sessions supported (voice, video, mixture of sessions, etc.). In the solution of Option 2, different feature tags, and Feature-Caps headers can be used.

Figure 6:
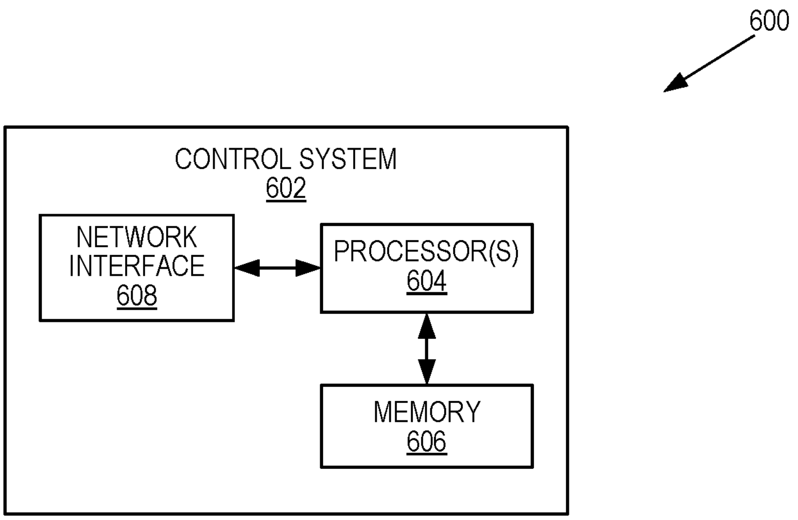
FIGS. 6, 7, and 8 are schematic block diagrams of example embodiments of a network node.

FIG. 6 is a schematic block diagram of a network node 600 according to some embodiments of the present disclosure. Optional features are represented by dashed boxes. The network node 600 may be, for example, an IMS node (e.g., S-CSCF 228), a core network node (e.g., HSS 234), a network node associated to the MMTEL service, or the like. As illustrated, the network node 600 includes a control system 602 that includes one or more processors 604 (e.g., Central Processing Units (CPUs), Application Specific Integrated Circuits (ASICs), Field Programmable Gate Arrays (FPGAs), and/or the like), memory 606, and a network interface 608. The one or more processors 604 are also referred to herein as processing circuitry. The one or more processors 604 operate to provide one or more functions of the network node 600 as described herein (e.g., one or functions of the S-CSCF 228, or HSS 234 as described herein). In some embodiments, the function(s) are implemented in software that is stored, e.g., in the memory 606 and executed by the one or more processors 604.

Figure 7:
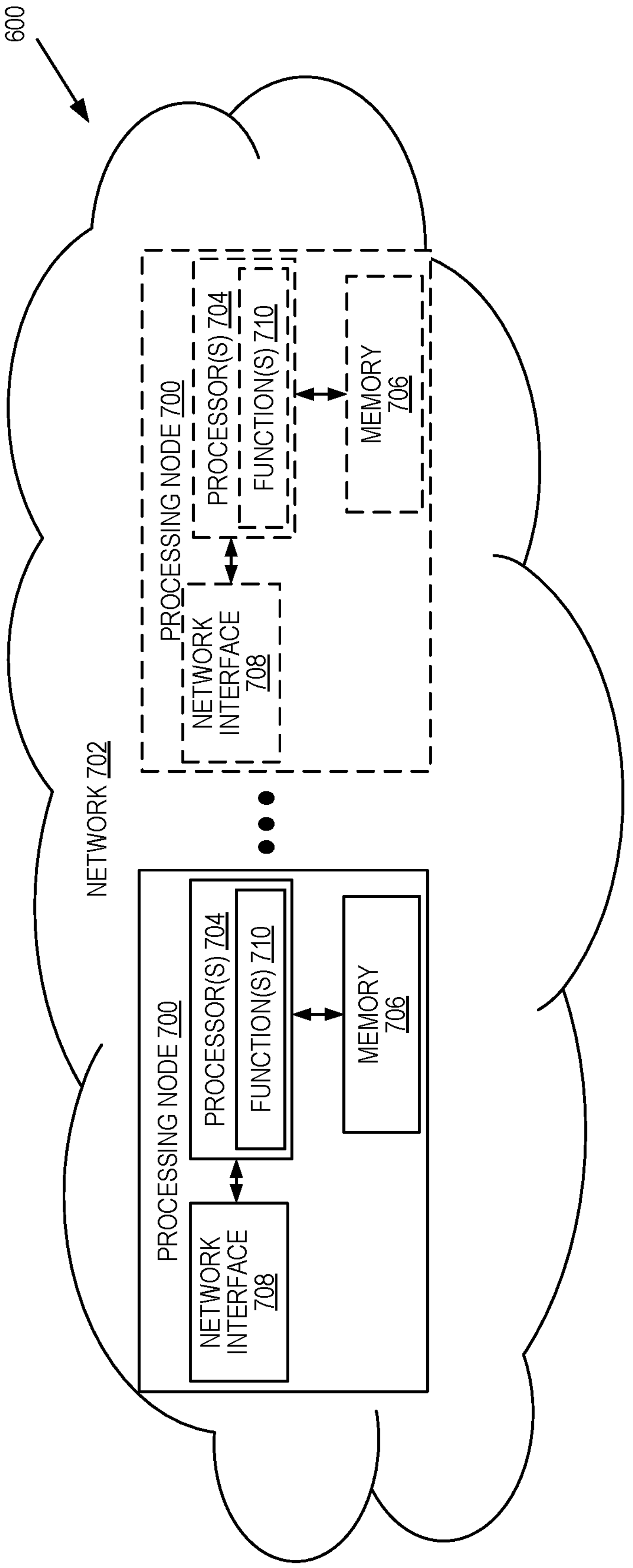

FIG. 7 is a schematic block diagram that illustrates a virtualized embodiment of the network node 600 according to some embodiments of the present disclosure. Again, optional features are represented by dashed boxes. As used herein, a "virtualized" network node is an implementation of the network node 600 in which at least a portion of the functionality of the network node 600 is implemented as a virtual component(s) (e.g., via a virtual machine(s) executing on a physical processing node(s) in a network(s)). As illustrated, in this example, the network node 600 includes one or more processing nodes 700 coupled to or included as part of a network(s) 702. Each processing node 700 includes one or more processors 704 (e.g., CPUs, ASICs, FPGAs, and/or the like), memory 706, and a network interface 708. In this example, functions 710 of the network node 600 described herein (e.g., one or functions of the S-CSCF 228, or HSS 234 as described herein) are implemented at the one or more processing nodes 700 or distributed across the two or more of the processing nodes 700 in any desired manner. In some particular embodiments, some or all of the functions 710 of the network node 600 described herein are implemented as virtual components executed by one or more virtual machines implemented in a virtual environment(s) hosted by the processing node(s) 700.

In some embodiments, a computer program including instructions which, when executed by at least one processor, causes the at least one processor to carry out the functionality of network node 600 or a node (e.g., a processing node 700) implementing one or more of the functions 710 of the network node 600 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 8:
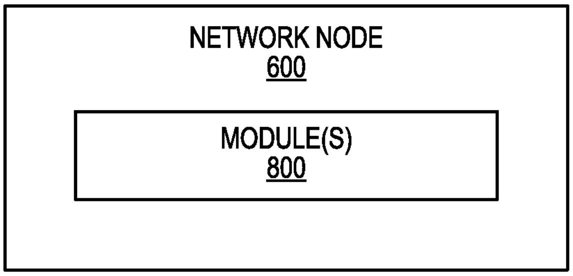

FIG. 8 is a schematic block diagram of the network node 600 according to some other embodiments of the present disclosure. The network node 600 includes one or more modules 800, each of which is implemented in software. The module(s) 800 provide the functionality of the network node 600 described herein (e.g., one or functions of the S-CSCF 228, or HSS 234 as described herein). This discussion is equally applicable to the processing node 700 of FIG. 7 where the modules 800 may be implemented at one of the processing nodes 700 or distributed across multiple processing nodes 700.

Figure 9:
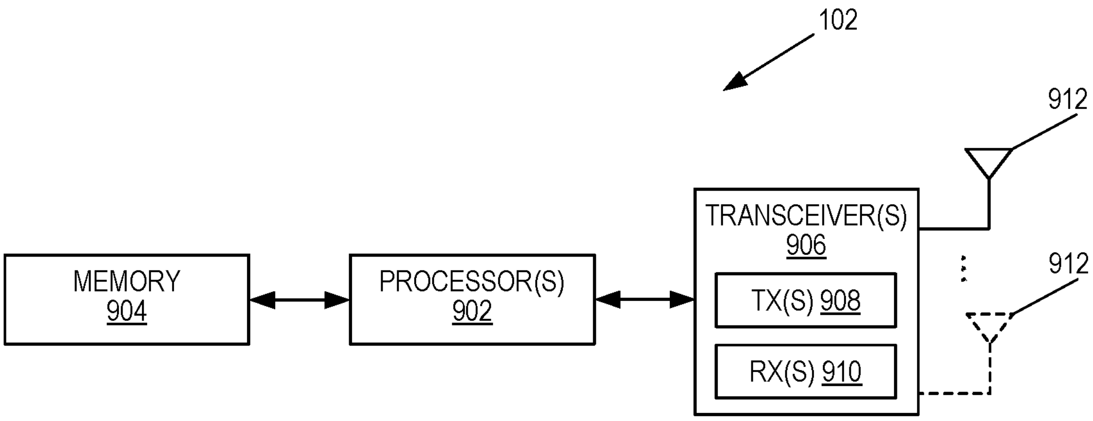
FIGS. 9 and 10 are schematic block diagrams of example embodiments of a UE.

FIG. 9 is a schematic block diagram of the UE 102 according to some embodiments of the present disclosure. As illustrated, the UE 102 includes one or more processors 902 (e.g., CPUs, ASICs, FPGAs, and/or the like), memory 904, and one or more transceivers 906 each including one or more transmitters 908 and one or more receivers 910 coupled to one or more antennas 912. The transceiver(s) 906 includes radio-front end circuitry connected to the antenna(s) 912 that is configured to condition signals communicated between the antenna(s) 912 and the processor(s) 902, as will be appreciated by on of ordinary skill in the art. The processors 902 are also referred to herein as processing circuitry. The transceivers 906 are also referred to herein as radio circuitry. In some embodiments, the functionality of the UE 102 described above may be fully or partially implemented in software that is, e.g., stored in the memory 904 and executed by the processor(s) 902. Note that the UE 102 may include additional components not illustrated in FIG. 9 such as, e.g., one or more user interface components (e.g., an input/output interface including a display, buttons, a touch screen, a microphone, a speaker(s), and/or the like and/or any other components for allowing input of information into the UE 102 and/or allowing output of information from the UE 102), a power supply (e.g., a battery and associated power circuitry), etc.

In some embodiments, a computer program including instructions which, when executed by at least one processor, causes the at least one processor to carry out the functionality of the UE 102 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 10:
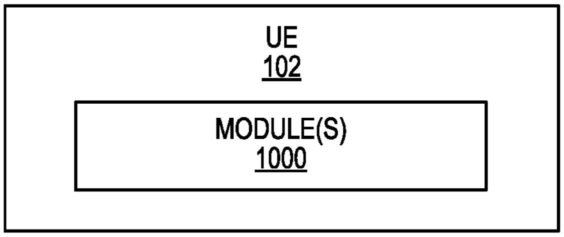

FIG. 10 is a schematic block diagram of the UE 102 according to some other embodiments of the present disclosure. The UE 102 includes one or more modules 1000, each of which is implemented in software. The module(s) 1000 provide the functionality of the UE 102 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Those skilled in the art will recognize improvements and modifications to the embodiments of the present disclosure. All such improvements and modifications are considered within the scope of the concepts disclosed herein.

The invention claimed is:

1. A method performed by a first wireless communication device for simultaneous Internet Protocol, IP, Multimedia Subsystem, IMS, sessions between the first wireless communication device and two or more other wireless communication devices, the method comprising:

establishing a first IMS session with a second wireless communication device; and while the first IMS session is ongoing and without placing the first IMS session on hold, establishing a second IMS session with a third wireless communication device, wherein the second IMS session is a separate IMS session, distinct from the first IMS session, between the first wireless communication device and the third wireless communication device, both the first IMS session and the second IMS session being concurrently active with each having its own respective Quality of Service, QoS, resources reserved.

2. The method of claim 1 wherein the first IMS session and the second IMS sessions are simultaneous IMS voice sessions.

3. The method of claim 1 wherein the first IMS session is an IMS voice session, an IMS data session, or an IMS video session, and the second IMS session is an IMS voice session, an IMS data session, or an IMS video session, and the first IMS session and the second IMS session are simultaneous IMS sessions.

4. The method of claim 1 wherein the first IMS session is an IMS session that supports a combination of two or more of voice, video, and data, and/or the second IMS session is an IMS session that supports a combination of two or more of voice, video, and data.

5. The method of claim 1 wherein the simultaneous IMS sessions are permitted only if an associated P-CSCF does not have any policy that prohibits resource reservation for any media for simultaneous IMS sessions initiated or received by the same UE.

6. A first wireless communication device for simultaneous Internet Protocol, IP, Multimedia Subsystem, IMS, sessions between the first wireless communication device and two or more other wireless communication devices, the first wireless communication device comprising:

one or more transmitters;

one or more receivers; and processing circuitry associated with the one or more transmitters and the one or more receivers, the processing circuitry configured to cause the first wireless communication device to:

establish a first IMS session with a second wireless communication device; and while the first IMS session is ongoing and without placing the first IMS session on hold, establish a second IMS session with a third wireless communication device, wherein the second IMS session is a separate IMS session, distinct from the first IMS session, between the first wireless communication device and the third wireless communication device, both the first IMS session and the second IMS session being concurrently active with each having its own respective Quality of Service, QoS, resources reserved.

7. A method performed by network node to enable a feature for supporting simultaneous Internet Protocol, IP, Multimedia Subsystem, IMS, sessions between a first wireless communication device and two or more other wireless communication devices, the method comprising:

obtaining information that indicates that a first wireless communication device is associated to a subscription to a simultaneous IMS sessions feature;

storing the information;

while the first wireless communication device has a first IMS session that is ongoing with a second wireless communication device:

receiving a request for establishment of a second IMS session between a third wireless communication device and the first wireless communication device, the second IMS session being a separate IMS session, distinct from the first IMS session, that is simultaneous with the first IMS session, both the first IMS session and the second IMS session being concurrently active with each having its own respective Quality of Service, QoS, resources reserved;

determining that the second IMS session is allowed based on the stored information; and allowing establishment of the second IMS session to continue responsive to determining that the second IMS session is allowed.

8. The method of claim 7 wherein obtaining the information comprises receiving a subscription profile associated to the first wireless communication device from a Home Subscriber Server, HSS, the subscription profile comprising the information that indicates that the first wireless communication device is associated to a subscription to the simultaneous IMS sessions feature.

9. The method of claim 7 wherein the network node is an IMS node.

10. The method of claim 9 wherein the IMS node is a Serving Call Session Control Function, S-CSCF.

11. The method of claim 7 wherein the network node is a network node that hosts a MMTEL service.

12. The method of claim 7 wherein the first IMS session and the second IMS sessions are simultaneous IMS voice sessions.

13. The method of claim 7 wherein the first IMS session is an IMS voice session, an IMS data session, or an IMS video session, and the second IMS session is an IMS voice session, an IMS data session, or an IMS video session, and the first IMS session and the second IMS session are simultaneous IMS sessions.

14. The method of claim 7 wherein the first IMS session is an IMS session that supports a combination of two or more of voice, video, and data, and/or the second IMS session is an IMS session that supports a combination of two or more of voice, video, and data.

15. The method of claim 7 wherein the simultaneous IMS sessions are permitted only if an associated P-CSCF does not have any policy that prohibits resource reservation for any media for simultaneous IMS sessions initiated or received by the same UE.

16. A network node for enabling a feature for supporting simultaneous Internet Protocol, IP, Multimedia Subsystem, IMS, sessions between a first wireless communication device and two or more other wireless communication devices, the network node comprising processing circuitry configured to cause the network node to:

obtain information that indicates that a first wireless communication device is associated to a subscription to a simultaneous IMS sessions feature;

store the information;

while the first wireless communication device has a first IMS session that is ongoing with a second wireless communication device:

receive a request for establishment of a second IMS session between a third wireless communication device and the first wireless communication device, the second IMS session being a separate IMS session, distinct from the first IMS session, that is simultaneous with the first IMS session, both the first IMS session and the second IMS session being concurrently active with each having its own respective Quality of Service, QoS, resources reserved;

determine that the second IMS session is allowed based on the stored information; and allow establishment of the second IMS session to continue responsive to determining that the second IMS session is allowed.

* * * * *